June 13, 1944.  S. VORECH  2,351,307
CONTROLLING MECHANISM
Filed Aug. 18, 1941  4 Sheets-Sheet 1

Inventor
Stephen Vorech.
By N. D. Parker Jr.
Attorney

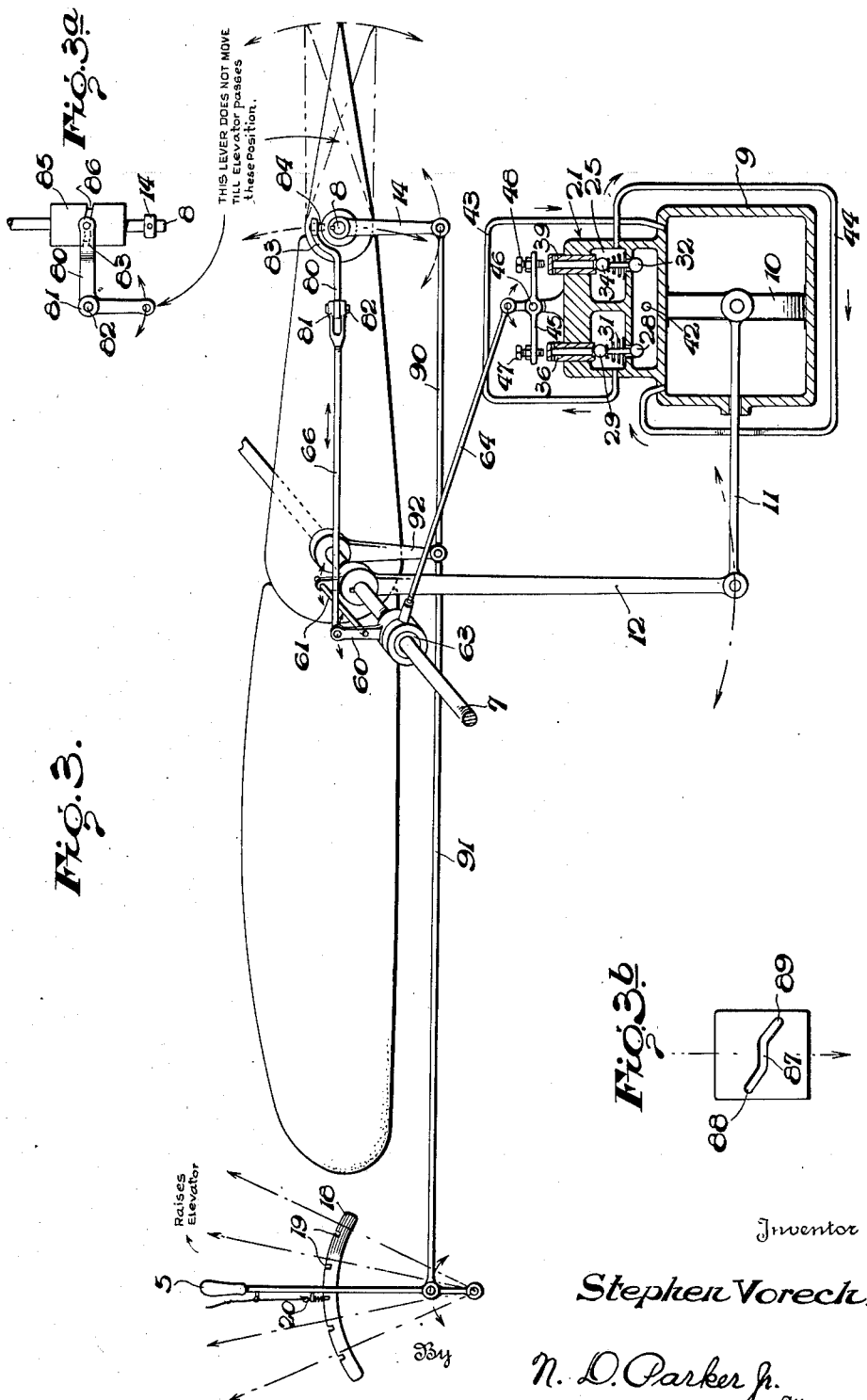

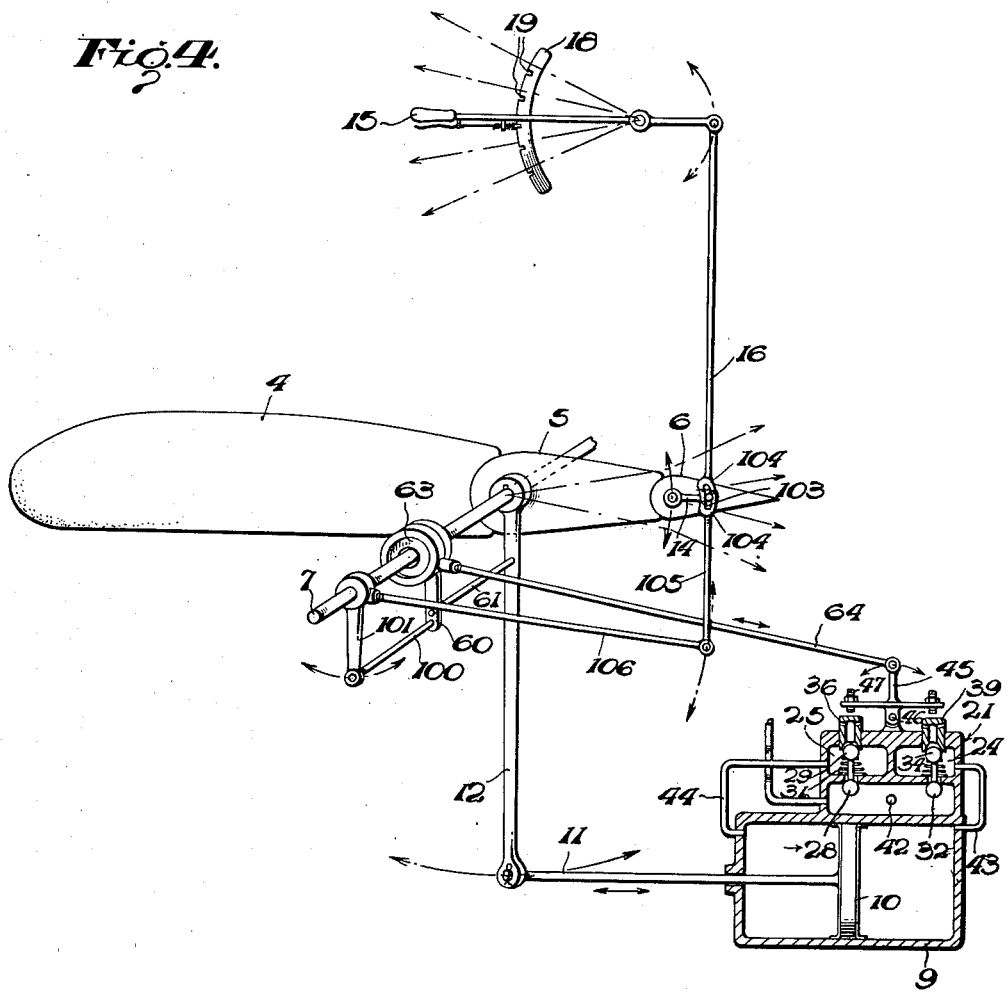

Patented June 13, 1944

2,351,307

UNITED STATES PATENT OFFICE 2,351,307

CONTROLLING MECHANISM

Stephen Vorech, Elyria, Ohio, assignor to Bendix-Westinghouse Automotive Air Brake Company, Elyria, Ohio, a corporation of Delaware Application August 18, 1941, Serial No. 407,363

19 Claims. (Cl. 244—85)

This invention relates to vehicle control mechanisms and more particularly to a control mechanism for steering airplanes.

One of the objects of the present invention is to provide power operated means under the control of the pilot for controlling the direction of flight of an airplane.

Another object of the invention is to provide means for controlling the steering mechanism of an airplane manually during slight changes in the direction of flight, and for controlling the mechanism by power when greater changes of direction are desired.

Yet another object of the invention is to provide a single manually operable control for providing combined manual and power control of an airplane steering mechanism.

A further object of the invention is to provide power operated control mechanism for steering an air craft so constituted that the position of the control surfaces will at all times be determined by the position of a manually operable member under the control of the pilot.

Still another object of the invention is to provide a sensitive manual and power control for the control surfaces of an airplane so constituted as to combine the advantages of power control with the advantages of the more sensitive control normally obtainable by manual operation.

Another object of the invention is to provide power operated control mechanism for steering an airplane so constituted as to indicate to the operator the degree of power supplied to the power operated mechanism.

Other objects and novel features of the invention will appear more fully hereinafter from the following detailed description when taken in connection with the accompanying drawings illustrating a number of embodiments of the invention. It is to be expressly understood, however, that the drawings are employed for purposes of illustration only and are not designed as a definition of the limits of the invention, reference being had for this latter purpose to the appended claims.

In the drawings, wherein similar reference characters refer to similar parts throughout the several views:

Fig. 3 is a diagrammatic view, partially in section, of another modification of an airplane control mechanism;

Fig. 3a is a partial plan view of a portion of the valve operating mechanism of Fig. 3;

Fig. 3b is a developed view of the cam shown in Fig. 3a, and

Fig. 4 is a diagrammatic view, partially in section, of still another modification of an airplane control mechanism.

Figure 1:
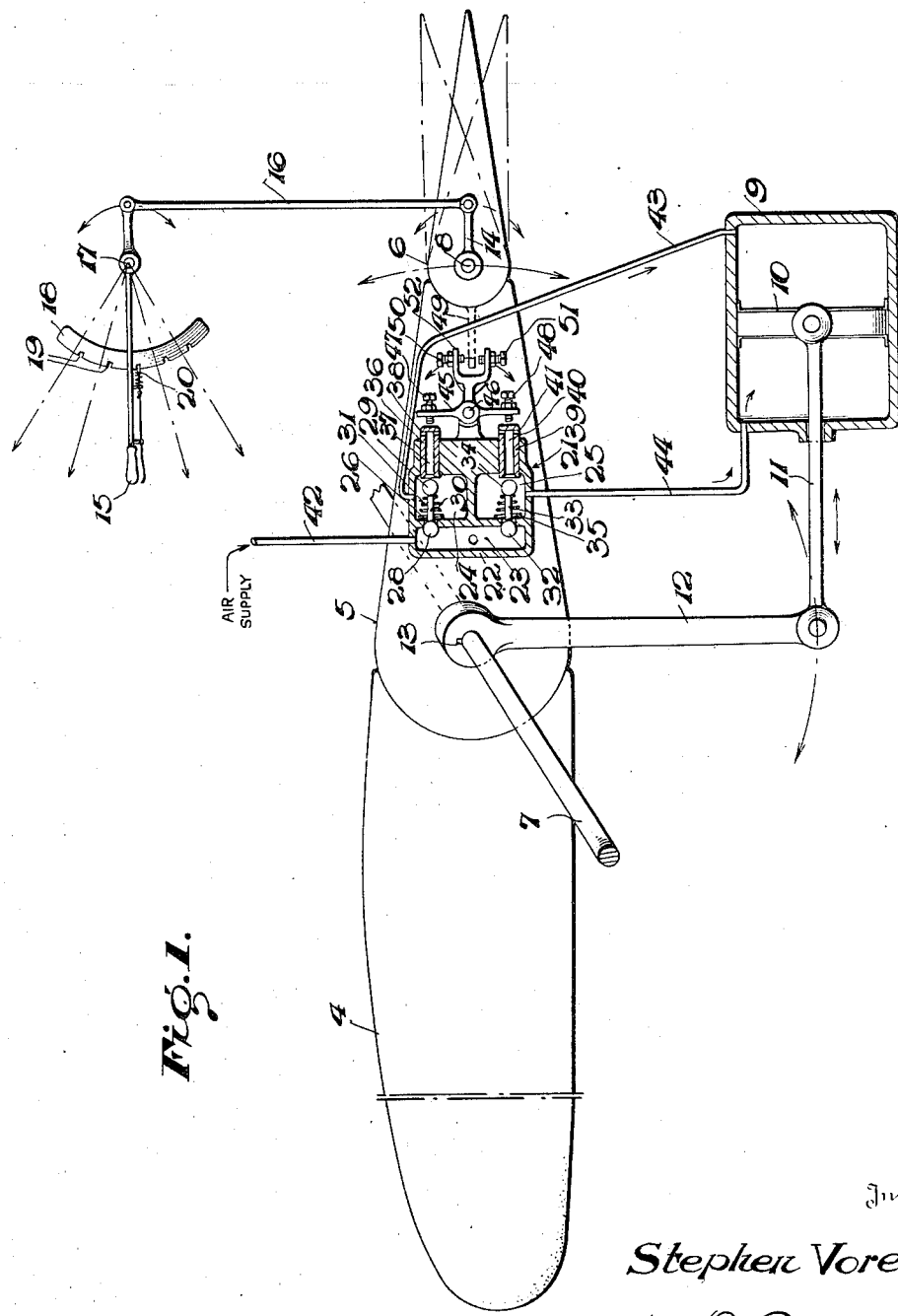
Fig. 1 is a diagrammatic view, partially in section, of an airplane control mechanism constructed in accordance with the principles of the present invention.

Referring more particularly to Fig. 1, the present invention is illustrated therein in connection with an airplane provided with a fixed control surface or wing portion 4, preferably rigidly attached to the airplane in any suitable manner, not shown, together with a pair of auxiliary airfoils or control surfaces 5 and 6 pivotally mounted with respect thereto, airfoil 5 being mounted on a shaft 7 for rotation with respect to the wing portion 4, and the airfoil section 6 being pivotally mounted for motion with respect to the airfoil 5 on a shaft 8. A fluid motor 9 of the double acting type is mounted on the frame work of the airplane in any suitable manner, not shown, the motor being provided with a double acting piston 10 and a piston rod 11 attached thereto and adapted to actuate the airfoil 5 through the medium of a lever 12 keyed to the shaft 7 by means of a key 13, it being understood that the airfoil 5 is mounted for rotation with the shaft 7 and that the shaft 7 is pivotally mounted on the frame work of the plane. In like manner the shaft 8 is rigidly affixed to the airfoil 6 for rotation therewith, the shaft being journaled on the frame work of the airfoil section 5 to allow rotation of the airfoil 6 with respect thereto, and in order that the movement of the airfoil 6 may be properly controlled by the operator, a lever 14 is attached to the shaft 8 for rotation therewith, the other end of the lever being connected to a manually operable control lever 15 by means of a connecting rod 16, pivotally connected, as shown, to the right end of the lever 14 and to the right end of the control lever 15. The latter is pivotally mounted on the frame work of the plane as by means of a shaft 17, a quadrant 18 provided with suitable notches 19 being also attached to the frame work of the plane, and serving in connection with a detent mechanism 20 carried by the lever 15, to retain the lever in any position desired by the pilot.

Control means are provided for controlling the supply of fluid pressure to the fluid motor 9, and in the embodiment illustrated in Fig. 1, such control means include a valvular mechanism 21 suitably attached to and carried by the movable wing section 5, the valve means comprising a casing 22 attached to the frame work of the wing section 5 in any suitable manner, the casing 22 being so constituted as to provide an inlet chamber 23 and a pair of outlet chambers 24 and 25, with ports 26 and 27 being provided in the casing for connecting the inlet chamber with outlet chambers 24 and 25 respectively. Port 26 is normally closed by means of an intake valve 28 having an exhaust valve 29 attached thereto by means of a stem 30, the intake valve 28 being normally urged against the left end of the port 26 by means of a spring 31 interposed between the left side of the exhaust valve and a portion of the valve casing. In like manner the port 27 is normally closed by means of an intake valve 32 connected by means of a member 33 with an exhaust valve 34 positioned in the outlet chamber 25, the intake valve being normally held in closed position by means of a spring 35 positioned between the left side of the exhaust valve and a portion of the casing. Means for actuating the intake and exhaust valves 28 and 29 include a valve actuating plunger 36 slidably mounted in the casing and provided with a central bore 37 communicating at one end with the outlet chamber 24 and at the other end with atmosphere through ports 38 formed in the plunger and connected with the bore 37. In like manner a valve actuating plunger 39 is slidably mounted in the lower portion of the casing for actuating the intake and exhaust valves 32 and 34, the plunger being provided with a central port 40 connected at the left end with the outlet chamber 25 and at the right end with atmosphere by means of exhaust ports 41. Since the wing section 5 carrying the valve mechanism is movable with respect to the frame work of the plane, and consequently with respect to the fluid motor 9, the inlet chamber 23 is connected with a suitable source of fluid pressure by means of a flexible tube 42, the outlet chamber 24 being connected with the right side of the fluid motor 9 by means of a flexible conduit 43 and the outlet chamber 25 being connected with the left end of the fluid motor 9 by means of a flexible conduit 44. It will thus be apparent that on actuation of the valve plungers 36 or 39, the valves 28 and 29 can be operated to alternately connect the right end of the fluid motor with the source of fluid pressure through the inlet chamber 23 and the conduit 42, or with atmosphere through the bore 37 and ports 38 or the valve operating plunger 36, while the valves 32 and 34 can be actuated to either connect the source of fluid pressure with the left end of the fluid motor or to connect the left end of the fluid motor with atmosphere through the port 40 and the exhaust port 41 of the plunger 39.

In order that the valves may be selectively and sequentially operated, a valve operating rocker arm 45 is pivotally mounted on the valve casing 22 as by means of a pivot pin 46, the arm being adapted on operation in a counterclockwise direction to move the valve plunger 36 to the left through the medium of an adjustable screw 47 threadedly mounted in the upper end of the rocker arm in alignment with the valve actuating plunger, clockwise motion of the rocker arm serving to move the valve operating plunger 39 to the left to actuate the valves through the medium of a similar adjustable screw 48 threadedly mounted in the lower end of the rocker arm. It will thus be apparent that counterclockwise rotation of the rocker arm will serve to first move the plunger 36 to the left to engage the exhaust valve 29 and prevent communication with atmosphere through the bore 37, further movement of the plunger to the left serving to move the intake valve 28 to open position against the force of the valve spring 31, thus supplying fluid pressure to the right end of the fluid motor 9 through the conduit 42, inlet chamber 23, inlet port 26, outlet chamber 24, and flexible conduit 43. In like manner, clockwise rotation of the rocker arm 45 serves to first permit closing of the intake valve 28 under the action of the spring 31, further movement of the rocker arm permitting the fluid pressure in the outlet chamber 24 to force the plunger 36 to the right and out of engagement with the exhaust valve 29, whereupon fluid pressure from the right end of the motor 9 will be exhausted to atmosphere through conduit 43, outlet chamber 24, bore 37 and exhaust ports 38, and sufficient movement of plunger 39 to the left will close off the bore 40 and open the inlet port 27 to supply fluid pressure to the left end of the motor 9 from the inlet chamber 23 to the port 27, outlet chamber 25 and the flexible conduit 44. With the rocker arm 45 in the neutral position shown, it will be readily understood that any pressure in the outlet chambers 24 and 25 will serve to force the plungers 36 and 39 to the right and out of engagement with the exhaust valves 29 and 34 to connect both sides of the fluid motor 9 with atmosphere through the channels previously described.

While power operation of the control airfoil 5 is desirable and often necessary on large airplanes due to the forces necessary to move such control surfaces against the force exerted by the air stream, and means could be provided for actuating the valve mechanism 21 directly by a control manually operated by the pilot, it has been found that a more sensitive control can be obtained in many cases by providing a manually operable control surface controlled by the pilot which may serve to guide the plane manually when slight changes of direction are desired, such control mechanisms being so constituted as to permit the power actuated airfoil to come into action only when more pronounced changes of direction in the flight of the plane are desired with a consequent increase in the force necessary to operate the control surfaces, and to this end means are provided to permit limited operation of the auxiliary control surface 6 without corresponding actuation of the valve mechanism 21 to energize the fluid motor 9. As heretofore stated the control airfoil 6 is pivotally mounted on and carried by the power operated control surface and is adapted to be manually operated about its shaft 8 by means of a lever 15 connected thereto through the rod 16 and the lever arm 14. In order that this desirable form of control may b accomplished, the lever arm 14 is provided wit an extension 49 adapted to respectively engage pair of set screws 50 and 51 threadedly mounte in a forked lever arm 52 carried by the rocke arm 45, the set screws 50 and 51 being so adjuste as to permit limited movement of the lever ar 49 and the wing section 6 without correspondin actuation of the rocker arm 45 to cause operatio of the valves and consequent energization of th fluid motor.

In the operation of the novel control mech anism hereinbefore described, it is pointed o that the notches 19 are so spaced and the s screws 47, 48, 50 and 51 may be so adjusted th movement of the lever 15 to the notch shown above the neutral position, for example, will serve to move the control surface 6 in a clockwise direction about shaft 8 through an angle sufficient to cause a change of direction in the motion of the plane without, however, rotating the rocker arm 45 sufficiently to actuate the valve mechanism and connect the fluid motor 9 with the source of fluid pressure, it being noted that movement of the lever 15 and the control surface 6 in the direction indicated will tend to cause counterclockwise rotation of the rocker arm 45 and consequent operation of the valve operating plunger 36. With the control surface 6 operated as described, the airflow along the control surfaces will tend to oppose such motion of the control surface, and in view of the fact that the lever 15 and the rod 16 are maintained in a fixed position due to the engagement of the detent 20 with the notches 19, it will be apparent that any movement of the airfoil 6 will be about the point of connection between the rod 16 and the arm 14, with a resultant tendency to move the control surface 6 in a clockwise direction about the point of connection with the rod 16 and the control surface 5 in a counterclockwise direction about the shaft 7. If the lever 15 is now moved further in a clockwise direction to a point where the detent 20 engages the next notch, further displacement of the control surface 6 will occur, and with the set screws of the valvular mechanism adjusted in the manner described, the lever arm 49 will engage the upper set screw 50 to cause counterclockwise rotation of the rocker arm 45 with resultant operation of the valve operating plunger 36 to close the exhaust valve and open the intake valve, thus admitting fluid pressure from the supply line 42 to the right end of the cylinder 9, with a corresponding movement of the piston 10 to the left to cause clockwise rotation of the control surface 5 with the shaft 7 toward a position tending to be in alignment with the control surface 6. As this rotation of the control surface 5 occurs, the valvular mechanism will move bodily with relation to the lever 49 in such a manner as to permit clockwise rotation of the rocker arm 45 with subsequent movement of the intake valve to closed position under the action of the spring 21, further movement of the parts in the manner stated allowing the pressure in the outlet chamber 24 to force the plunger 36 to the right sufficiently to open the exhaust valve and permit the exhaust of fluid pressure from the right end of the cylinder. It will thus be evident that the valve mechanism is of the self-lapping type, serving to energize the cylinder in response to a given amount of movement of the control surface 6 and the lever arm 49, and to deenergize the cylinder as soon as the control surface 5 moves to a position corresponding to that for which the control lever 15 is set by the pilot. In like manner initial movement of the lever 15 in a counterclockwise direction to the first notch from neutral position will move the control surface 6 in a counterclockwise direction to cause a change in the direction of movement of the plane, while movement to the next notch on the quadrant 18 will operate the rocker arm 45 in a clockwise direction, with consequent operation of the valve actuating plunger 39 to admit fluid pressure to the left end of the fluid motor 9 and effect movement of the piston 10 to the right to cause counterclockwise rotation of the control surface 5 about the shaft 7. While it is believed desirable to control small changes of direction of the airplane by manual operation of the control surface 6 in the manner stated, it will also be understood that the valve mechanism can be so adjusted by changing the position of the adjustable set screws as to permit immediate actuation of the valves to energize the fluid motor 9, thus providing the pilot with immediate power actuation of the control surfaces on movement of the lever 15 in either direction. It is also noted that any tendency for the airflow over the control surfaces to move the control surface 5 in the direction opposite to that intended by the pilot will cause actuation of the valve mechanism to energize the fluid motor in such a manner as to oppose such a displacement of the control surface by the air stream.

The modification of the invention illustrated in Fig. 2 includes control surfaces 4, 5 and 6, arranged as previously described in connection with Fig. 1 of the drawings, the control surface 5 being mounted for rotation on a shaft 7, and the control surface 6 being mounted for rotation on a shaft 8. Power actuation of the control surface 5 is accomplished by means of a fluid motor 9 suitably mounted on the frame work of the plane, a piston 10 slidably mounted therein being connected for actuation of the shaft 7 and the wing surface 5 by means of a piston rod 11 and a lever 12 connected thereto at the lower end and connected to the shaft 7 for rotation therewith by means of a key 13. An operating lever 14 is connected with the shaft 8 and thence with the control surface 6, the control surface and lever being actuated manually by the operation of a lever 15 connected with the lever 14 by means of a rod 16 and mounted for rotation on a shaft 17. A fixed quadrant 18 provided with notches 19 serves to control the position of the lever 15 through the engagement of the slot 19 by a detent 20 carried on the lever. A control valve mechanism 21, identical in construction with the control valve mechanism illustrated in Fig. 1 of the drawings is mounted on the fluid motor 9 rather than on the moving control surface 5, this valve mechanism being provided with a casing 22, an inlet chamber 23 connected in any suitable manner with a source of fluid pressure, outlet chambers 24 and 25 having a connection with said inlet chamber through ports 26 and 27 respectively, and intake valve 28 having an exhaust valve 29 connected thereto by means of a rod 30 being normally maintained in a position to close the port 26 by means of a spring 31, and a valve 32 being provided for normally closing the port 27, this valve being connected by means of a rod 33 with an exhaust valve 34, the valve 32 normally being maintained in the position to close the port 27 by means of a spring 35 interposed between the exhaust valve 34 and a portion of the valve casing 22. A valve actuating plunger 36 is slidably mounted in the casing for actuating the intake and exhaust valves 28 and 29, the plunger being provided with a central bore 37, this bore serving to connect the outlet chamber 24 with atmosphere by way of exhaust ports 38 formed in the plunger. In like manner a valve operating plunger 39 is provided for actuating the valves 32 and 34, the bore 40 in the plunger serving to connect the outlet chamber 25 with atmosphere through the exhaust ports 41. The inlet chamber 23 is connected with a suitable source of fluid pressure supply by means of a conduit 42, while the outlet chambers 24 and 25 are connected with the right and left ends of the fluid motor 9 respectively by means of conduits 43 and 44, it thus being evident that on operation of the valve plungers 36 or 39, either end of the fluid motor may be energized or de-energized at will. Actuation of the valve plungers is accomplished through the medium of a rocker arm 45 pivotally mounted on the casing 21 by means of a suitable pivot pin 46, the rocker arm being provided with adjustable set screws 47 and 48 for engagement with the valve actuating plungers, and the rocker arm being arranged for actuation by the pilot through suitable connections, hereinafter to be described, with a lever arm 49 connected to and adapted to move with the control surface 6 about the shaft 8.

The mounting of the valve mechanism 21 on the fluid motor 9 which is attached to the framework of the plane necessitates the use of novel connecting means between the rocker arm 45 and the lever 49, such means being constituted in this particular embodiment of the invention by a rocking lever 60 mounted for pivotal movement with respect to the lever 12 on a pin 61 rigidly mounted in an extension 62 of the lever 12 and in a position parallel with the shaft 7, the lower end of this lever having an enlarged bore 63 concentric with the shaft 7 and permitting limited angular movement of the lever about the pin 61, together with a connecting rod 64 connected to the rocker arm 45 by means of a pin 65 and having a pivotal connection with the hub of the lever 60 at its left end, the bore 63 being of such diameter as to permit movement of the lever 60 about the pin 61 sufficient to actuate the rocker arm 45 to operate the intake and exhaust valve through the medium of the valve actuating plungers 36 and 39. The upper end of the lever 60 is connected with the lever 49 by means of a connecting rod 66 pivotally connected with the upper end thereof and connected at its right end with a bell crank 67 pivotally mounted on the control surface 5 by means of a shaft 68, the bell crank being provided with adjustable set screws 69 and 70 adapted to alternately engage the lever 49 on movement thereof in either direction.

If the pilot wishes, for example to move the control surface 6 in a clockwise direction about the shaft 8 under manual control alone for effecting a slight change in the direction of movement of the plane, the lever 15 is moved in a clockwise direction until the detent 20 engages the notch directly above the neutral notch on the quadrant 18, whereupon the control surface is rotated about the shaft 8 with consequent rotation of the lever 49, which may engage the set screw 69 without, however, causing actual movement of the bell crank 67 and the attached valve linkage due to the normal spacing between the lever 49 and the set screw. On further movement of the lever 15 in a clockwise direction to the next notch on the quadrant 18, however, the lever 49 will engage the set screw 69, causing counterclockwise rotation of the bell crank 67 and corresponding clockwise rotation of the lever 60 about the pin 61 to move the connecting rod 64 to the left and rotate the rocker arm 45 in a counterclockwise direction with consequent actuation of the valve plunger 36 to close the exhaust valve and open the intake valve, thus admitting fluid pressure to the right end of the fluid motor 9 through the conduit 43. As this energization of the motor occurs, the piston 10 will be forced to the left, moving the piston rod 11, the lever 12 and the control surface 5 in a clockwise direction until a position is reached such that the clockwise rotation of the control surface 5 permits clockwise rotation of the bell crank 67 and consequent closing of the intake valve 28. If further movement of the wing section 5 occurs under the influence of the fluid pressure in the motor 9, it will be readily understood that a further clockwise displacement of the bell crank 67 will be permitted with a consequent release of force on the valve actuating plunger 36 which will allow the exhausting of fluid pressure from the right end of the motor. In like manner operation of the lever 15 in a counterclockwise direction will first provide manual control of the control surface 6, further movement of the lever serving to actuate the bell crank 67 in a clockwise direction with consequent rotation of the rocker arm 45 through the connections described in a clockwise direction to actuate the valve plunger 39 and supply fluid pressure to the left end of the motor 9 for effecting power actuation of the control surface 5 in a counterclockwise direction.

While the control of the wing surfaces in this embodiment of the invention has the same resulting effect on the control of the plane as the arrangement described in connection with Fig. 1, it will be understood that in cases where it is desirable to mount the control valve mechanism on a fixed portion of the plane, novel means have been provided for effecting a connection between the manually operated control lever 15 and the valve mechanism through the movable control surface mechanism which operates to give the pilot complete control of the valve mechanism under all operating conditions.

Figure 2:
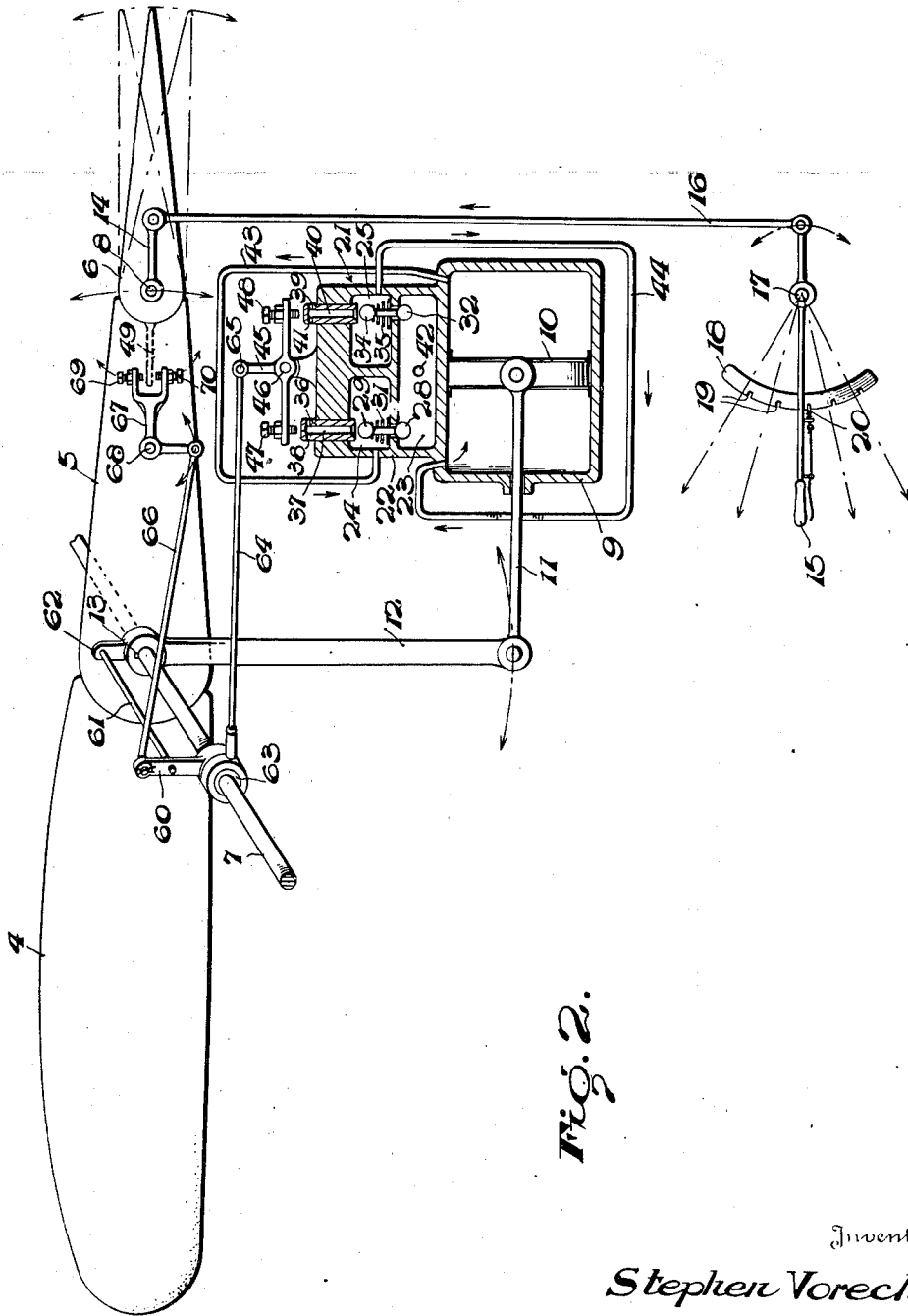
Fig. 2 is a diagrammatic view partially in section, of a modified airplane controlling mechanism.

The control mechanism illustrated in Fig. 3 of the drawings is very similar to that illustrated in Fig. 2, described heretofore, in having a fixed control surface 4, a control surface 5 actuated by a fluid motor 9 and a manually operable control surface 6 adapted to be actuated by a lever 15 provided with a quadrant 18, and a detent mechanism 20 adapted to engage the notches 19 thereon. A control valve mechanism 21 identical with that described in connection with Fig. 2 is mounted on or adjacent the fluid motor 9 and is adapted to be actuated by means of a rocker arm 45 actuated by movement of the lever 60 through a connecting rod 64, the lever 60 being actuated by operation of the control surface 6 through a connecting rod 66 connected at its left end to the lever 60 and its right end to the control surface 6 in a manner to be hereinafter described. An operating connection between the connecting rod 66 and the movable control surface 6 is established through the medium of a bell crank 80 mounted on a pivot pin 81 for movement substantially in the plane of the control surface, one end of the bell crank being connected with the right end of the connecting rod 66 by means of a pivot pin 82, and the other end being provided with a portion 83 provided on either section of the fork with a pin 84 adapted to engage a barrel cam mechanism 85 mounted on the shaft 8 for rotation therewith and with the control surface 6. As more particularly illustrated in Fig. 3b, showing the developed surface of the cam, a groove 86 is cut in the surface of the cam having a straight portion 87 lying in a plane perpendicular to the axis of the cam together with portions 88 and 89 cut in the surface of the cam in angular relation with the straight portion 87 and being directed respectively to either side of the center line of the straight portion of the groove. With the control mechanism positioned as shown, the pin 84 normally engages the straight portion of the cam groove midway between the junction thereof with the angular portions of the groove in such a manner that motion of the cam through a limited angle in either direction from the position shown may occur without embodying corresponding rotation to the bell crank 80. Thus, as viewed in Figs. 3 and 3a, it will be apparent that clockwise rotation of the cam 85 will, after a predetermined angle of movement, impart counterclockwise rotation to the bell crank 80, while counterclockwise rotation of the cam will impart clockwise rotation to the bell crank 80. In this particular embodiment of the invention, the lever 14 for actuating the control surface 6 is arranged at right angles to the position shown in Figs. 1 and 2, the lower end of the lever being connected with the lever 15 for operation thereby by means of a pair of connecting rods 90 and 91, the rods being connected respectively to the levers 14 and 15 as shown and being pivotally connected at their junction to an idler lever 92 journaled on the shaft 7 for rotation thereon, this idler lever being for the purpose of eliminating an unnecessarily long control rod between the lever 15 and the lever 14 which might sag or vibrate and cause difficulty in the proper operation of the control mechanism.

There has thus been provided by the form of the invention illustrated in Figs. 3, 3a and 3b, mechanism for manually controlling the direction of movement of the airplane when slight changes of direction are desired by the pilot, as well as for effecting a power control of the steering of the plane when greater changes of direction in the flight of the plane are necessary. If for example the pilot wishes to move the control surface 6 in a clockwise direction about the shaft 8, it is only necessary for him to move the control lever 15 in a counterclockwise direction until the detent 20 engages the quadrant slot at the left of the neutral position shown, whereupon the control surface 6 will be manually operated to effect a small change in the direction of movement of the plane, it being noted in this connection that the length of the straight groove portion 87 on the cam is of such length as to permit this degree of rotation of the control surface 6 and the cam 85 without in any way imparting rotational movement to the bell crank lever 80. If, however, it is desired to effect a greater change in the direction of movement of the plane, the lever 15 may be moved to the notch at the left end of the quadrant 18, wereupon the control surface 6 will be manually operated through a greater angle, and the cam will rotate through a sufficient angle to cause the pin 84 to leave the straight portion of the cam groove and enter the portion 88, with the result that counterclockwise rotation is imparted to the bell crank 80, rotating the lever 60 in a clockwise direction about the fixed pin 61 and actuating the left hand valve plunger 36 through the medium of the connections heretofore described. Thus fluid pressure will be admitted to the right end of the fluid motor 9 to move the piston 10 to the left and rotate the control surface 5 in a clockwise direction about the shaft 7, it being noted that during such rotation the angle formed between the control surfaces 5 and 6 will tend to lessen with a resultant change in the relative position of the cam 85 with relation to the pin 84 of the bell crank 80 which will eventually cause lapping of the valve mechanism so as to disconnect the source of fluid pressure from the right end of the fluid motor 9, further movement of the wing surface in the same direction serving to actuate the valve to exhaust air from the right end of the fluid motor.

Yet another form of the invention is illustrated in Fig. 4 of the drawings arranged to give a similar control of the movable control surfaces by the pilot but differing from the previous arrangement shown in the arrangement of the valve operating and controlling mechanism. Here again control surfaces or airfoils 4, 5 and 6 are provided with the latter two control surfaces pivotally mounted with respect to the fixed section 4, a fluid motor 9 being provided for effecting power operation of the control surface 5 through the medium of a lever 12 operatively connected therewith, and the control surface 6 being adapted for manual operation under the control of a lever 15 through the medium of a lever 14 connected thereto by means of a connecting rod 16 as shown. The fluid motor 9 is suitably mounted on the frame work of the plane as described in connection with the other modifications of the invention, but the control valve mechanism 21, mounted thereon, has been rearranged with respect thereto in order to bring the outlet chamber 24 adjacent the right end of the fluid motor and the outlet chamber 25 adjacent the left end of the fluid motor, these outlet chambers being connected with the right and left ends of the fluid motor by means of conduits 43 and 44 respectively. Means for actuating the control valve mechanism include a rocker arm 45 pivotally mounted on the valve casing, together with a valve operating lever 60 pivotally mounted on a rod 61 fixed on the lever 12 in parallel relationship with the shaft 7 and having an enlarged bore 63 concentric with and surrounding the shaft 7 to allow a limited motion of the lever 60 about the rod 61. The hub of the lever 60 is connected with the rocker arm 45 by means of a suitable connecting rod 64. The other end of the lever 60 is provided with a fixed pin spaced from the pivotal connection with the pin 61 and extending in parallel relationship therewith and with the shaft 7 and engaging the lower end of a lever 101 journaled for rotation on the shaft 7. This rotation of the lever 101 about the shaft 7 in either direction will tend to impart corresponding rotation of the lever 60 about the pivot pin 61 with consequent movement of the connecting rod 64 and the valve actuating rocker arm 45 in one direction or the other. For the purpose of operating the valve mechanism manually through the connections just described on initial movement of the control lever 15, the right end of the lever 14 is provided with an enlarged portion 104 having a slot 103 formed in the end thereof and adapted to engage a pivot pin carried by the ends of a connecting rod 105 which is connected at its lower end with a lever arm 106 operatively attached to the valve mechanism actuating lever 101.

If the pilot is desirous of changing the direction of motion of the airplane by rotating the control surface 6 in a clockwise direction, for example, this may be accomplished by moving the lever 15 in a clockwise direction so that the detent 20 engages the next notch on the quadrant 18, the control surface 6 being rotated about the shaft 8 by virtue of its connection with the lever 15 through the lever 14 and the connecting rod 16. Due to the length of the slot 103 formed at the end of the lever 14, no corresponding motion is imparted to the rod 105 and its connected valve mechanism through the pin during such movement, but on further movement of the lever 15 to the upper notch in the quadrant, the upper end of the slot on the end of the lever 14 will pick up the pin, moving the rod 105 downward to impart clockwise rotation to the lever 101, corresponding clockwise rotation being imparted to the lever 60 about the pin 61 and to the rocker arm 45 through the medium of the connecting rod 64, thus admitting fluid pressure to the right end of the fluid motor 9 and rotating the control section 5 in a clockwise direction to provide combined manual and power control of the direction of movement of the plane. As the control surface 5 moves to its new position however, the clockwise rotation of the lever 12 will carry the pin 61 with it, with a consequent tendency to rotate the lever 60 about the pin 100, continued movement in this direction thus eventually rotating the valve rocker arm 45 in the reverse direction to lap the valve and subsequently release fluid pressure from the right end of the fluid motor. In like manner movement of the control lever 15 in a counterclockwise direction will tend to first move the control surface 6 in the same direction under manual control, and subsequently to move the control surface 5 in a counterclockwise direction by virtue of the force exerted on lever 12 by the fluid motor 9.

It is also to be noted that whenever fluid pressure is present in either end of the fluid motor and consequently in either of the outlet chambers 24 and 25, there will be a corresponding reaction tending to move the valve plungers 36 or 37 outward, and this reaction will be transmitted back through the valve actuating linkage and can be felt by the pilot during operation of the hand lever 15, this desirable action thus giving the pilot at all times an indication of the power necessary to be applied to the wing surfaces in order to change the direction of motion of the plane.

While several embodiments of the invention have been illustrated and described herein, it is to be understood that the same is not limited thereto, but may be embodied in various forms as will now be understood by those skilled in the art. Reference, therefore, will be had to the appended claims for a definition of the limits of the invention.

What is claimed is:

1. The combination with an airplane having a fixed airfoil, a second airfoil pivotally mounted on said first airfoil and a third airfoil pivotally mounted on said second airfoil, of means for controlling the operation of said second and third named airfoils with respect to said first named airfoil including power means for operating said second named airfoil, manually controlled means for operating said third named airfoil, and means controlled by the relative movement of said second and third named airfoils for controlling the energization of said power means including a power controlling element responsive to the power supplied to the power means for apprising the operator of the degree of energization thereof.

2. The combination with an airplane having a fixed airfoil, a second airfoil pivotally mounted thereon for movement with respect thereto, and a third airfoil pivotally mounted for movement on said second named airfoil, of means including a fluid motor for actuating said second named airfoil, manually operable means for operating said third named airfoil, a source of fluid pressure, and valvular means carried by said second named airfoil operable in response to relative movement of said second and third named airfoils for controlling the energization of said fluid motor and including an element responsive to the pressure of fluid in the motor for apprising the operator of the degree of energization thereof.

3. The combination with an airplane having a fixed airfoil, a second airfoil pivotally mounted thereon, and a third airfoil pivotally mounted on said second named airfoil, of power means for actuating said second named airfoil, manually operable means for operating said third named airfoil, means controlled by the relative movement of said second and third named airfoils including an element responsive to the power supplied to sair power means for controlling the operation of said power means for apprising the operator of the degree of energization thereof, and means for adjusting said third named means for preventing energization of said power means except in response to movement of said third named airfoil a predetermined amount.

4. The combination in an airplane having a fixed airfoil, a second airfoil pivotally mounted thereon for movement with respect thereto, and a third airfoil carried by said second named airfoil and pivotally mounted thereon for movement with respect thereto, of manually operable means for actuating said third named airfoil, power means for actuating said second named airfoil, and means including an element responsive to the power supplied to said power means controlled by the relative movement of said second and third named airfoils in response to operation of said third named airfoil through a predetermined angle for energizing said power means for moving said second airfoil into substantial alignment with said third named airfoil and for apprising the operator of the degree of energization of said power means.

5. The combination with an airplane having a fixed airfoil, a second airfoil pivotally mounted thereon for movement with respect thereto and a third airfoil pivotally mounted on and carried by said second named airfoil, of manually operable means for controlling the operation of said third named airfoil, power means for controlling the operation of said second airfoil, and means controlled by the relative movement of said last named airfoils for controlling the energization and deenergization of said power means including an element subjected to the power supplied to said power means for apprising the operator of the degree of energization thereof.

6. The combination with an airplane having a main control surface and a pair of pivotally connected auxiliary control surfaces, one of said surfaces being pivotally mounted on the airplane, of power means for operating one of said control surfaces, manually operable means for operating another of said control surfaces, and means responsive to relative movement between said last named control surfaces including a power controlling element responsive to the power supplied to said power means for controlling the energization and deenergization of said power means and for apprising the operator of the degree of energization and de-energization thereof, whereby the position of both said control surfaces is controlled by the operation of said manually operable means.

7. The combination with an airplane having a fixed control surface, a second control surface pivotally mounted thereon and a third control surface carried by and pivotally mounted on said second named control surface, of means including a fluid motor for actuating said second named control surface, a source of fluid pressure, valvular means including members responsive to the pressure of fluid supplied to the fluid motor for controlling the flow of fluid pressure from said source to said motor, manually operable means for controlling the operation of said third named control surface, and means including a lost motion connection between said third named control surface and said valvular means for actuating said valvular means to supply fluid pressure to said motor on operation of said third named control surface through a predetermined angle and for apprising the operator of the degree of pressure acting on said pressure responsive members.

8. The combination with an airplane having a fixed control surface and a pair of pivotally connected control surfaces, one of said surfaces being pivotally mounted on the airplane, for controlling the direction of movement of the airplane, of power means for actuating one of said pair of control surfaces, means including an element responsive to the power supplied to the power means controlled by the movement of said third named control surface for controlling the energization of said power means and for apprising the operator of the degree of energization thereof, and manually operable means for operating said third named control surface a predetermined amount prior to operation of the means for controlling said power means.

9. The combination with an airplane having a main control surface and a pair of pivotally connected auxiliary control surfaces, one of said surfaces being pivotally mounted on the airplane, of power means for operating one of said control surfaces, manually operable means for operating another of said control surfaces, and means responsive to relative movement of said manually operable and power operated control surfaces including an element responsive to the power applied to said power means for controlling the energization of said power means and apprising the operator of the force necessary to operate said power operated control surface.

10. The combination with an airplane having a fixed airfoil, a second airfoil pivotally mounted on said first airfoil and a third airfoil pivotally mounted on said second airfoil for controlling the direction of flight of said airplane, of manually operable means for varying the position of one of said airfoils for changing the direction of flight of the airplane, and power means controlled by the operation of said manually operable means for controlling the operation of said other pivotally mounted airfoil and for opposing movement of said airfoils from a position determined by the operation of said manually operable means, said power means including a power controlling element responsive to the power applied to said other airfoil for apprising the operator of the degree of power applied thereto.

11. The combination with an airplane having a pair of pivotally connected airfoils, one of said airfoils being pivotally mounted on the airplane and movable for changing the direction of motion of the plane, of power means for actuating one of said airfoils, manually operable means for actuating said other airfoil, means including a power controlling element responsive to the power supplied to the power means for controlling the energization of said power means, and means for operatively connecting said controlling means, said power actuated airfoil and said manually actuated airfoil for controlling the operation of said controlling means and effecting combined manual and power operation of said manually actuated airfoil, said controlling means and connecting means serving to apprise the operator of the degree of energization of said power means.

12. The combination with an airplane having a pair of pivotally connected control surfaces, one of said surfaces being pivotally mounted on the airplane, for controlling the direction of motion of said airplane, of a fluid motor for actuating one of said control surfaces, manually operable means for actuating said other control surface, means including valvular means actuated by said manually operable means for controlling the energization of said fluid motor, and means responsive to the pressure in the fluid motor for opposing the movement of said manually operable means for controlling said second named control surface and actuating said valvular means.

13. The combination with an airplane having a pair of pivotally connected control surfaces, one of said surfaces being pivotally mounted on the airplane, for controlling the direction of flight of the airplane, of means including a fluid motor for actuating one of said control surfaces, manually operable means for actuating said other control surface, valvular means including an element responsive to the pressure in the motor for controlling the energization of said fluid motor and for apprising the operator of the degree of energization thereof, and means including a plurality of operative connections between said control surfaces for controlling the operation of said valve means in response to the operation of said manually operable means, and for effecting operation of both said control surfaces by said fluid motor.

14. The combination with an airplane having a pair of pivotally connected control surfaces, one of said surfaces being pivotally mounted on the airplane, for controlling the direction of flight of the airplane, of power means for actuating one of said control surfaces, manually operable means for actuating said other control surface, means including a connection between said control surfaces including an element responsive to the power supplied to said power means for controlling the energization of said power means and for apprising the operator of the degree of energization thereof, and adjustable means associated therewith for preventing energization of said power means by the operation of said connecting means except in response to movement of said second named control surface through a predetermined angle.

15. The combination with an airplane having a pair of pivotally connected movable control surfaces mounted thereon for controlling the direction of flight of the airplane, of means including a fluid motor for actuating one of said control surfaces, manually operable means for actuating said other control surface, valvular means including an element responsive to the pressure in said motor for controlling the energization of said fluid motor, means carried by said first named control surface and having a connection with said valvular means for actuating the same, and means carried by said second named control surface and adapted to engage the valve operating means carried by said first named control surface for effecting operation of said valvular means in response to movement of said second named control surface and for apprising the operator of the force necessary to operate said one control surface.

16. The combination with an airplane having a pair of pivotally connected control surfaces, one of said surfaces being pivotally mounted on the airplane for controlling the direction of flight of the airplane, of power means for actuating one of said control surfaces, manually operable means for actuating said other control surface, and means including an element responsive to the power supplied to said power means and a plurality of connections between said control surfaces operable in response to relative movement thereof for controlling the energization of said power means for actuating said first named control surface and apprising the operator of the degree of energization thereof and for effecting limited power actuation of said manually operable control surface.

17. The combination with an airplane having a plurality of serially pivotally connected relatively movable control surfaces, one of the surfaces being pivotally mounted on the airplane, for controlling the direction of flight of the airplane, of manually operable means for actuating one of said control surfaces, power operated means for actuating another of said control surfaces and said manually operable control surface, and means responsive to relative movement between said last named control surfaces for controlling the energization and deenergization of said power means including an element responsive to the power supplied to said power operated means for apprising the operator of the degree of energization thereof.

18. In combination with a fixed airfoil, of a pair of relatively movable airfoils having a direct operative connection therebetween and arranged in tandem, one of said airfoils being connected with the fixed airfoil and adapted for movement relative thereto, power means for operating one of the latter, manual means for operating the other relatively movable airfoil, and means controlled by relative movement between the two relatively movable airfoils for controlling the power means including an element responsive to the power supplied to the power means for apprising the operator of the degree of energization thereof.

19. The combination with a fixed airfoil, of a pair of relatively movable airfoils, means for directly and operatively connecting said pair of airfoils for permitting relative movement therebetween, means for directly connecting one of said pair of airfoils with the fixed airfoil for permitting relative movement therebetween, a power actuator for operating one of said pair of airfoils, manual means for operating the other of said other pair of airfoils, and means controlled by relative movement of said pair of airfoils for controlling the energization of said actuator including an element responsive to the power supplied to said actuator for opposing the operation of said manual means.

STEPHEN VORECH.